United States Patent Office 3,432,011
Patented Mar. 11, 1969

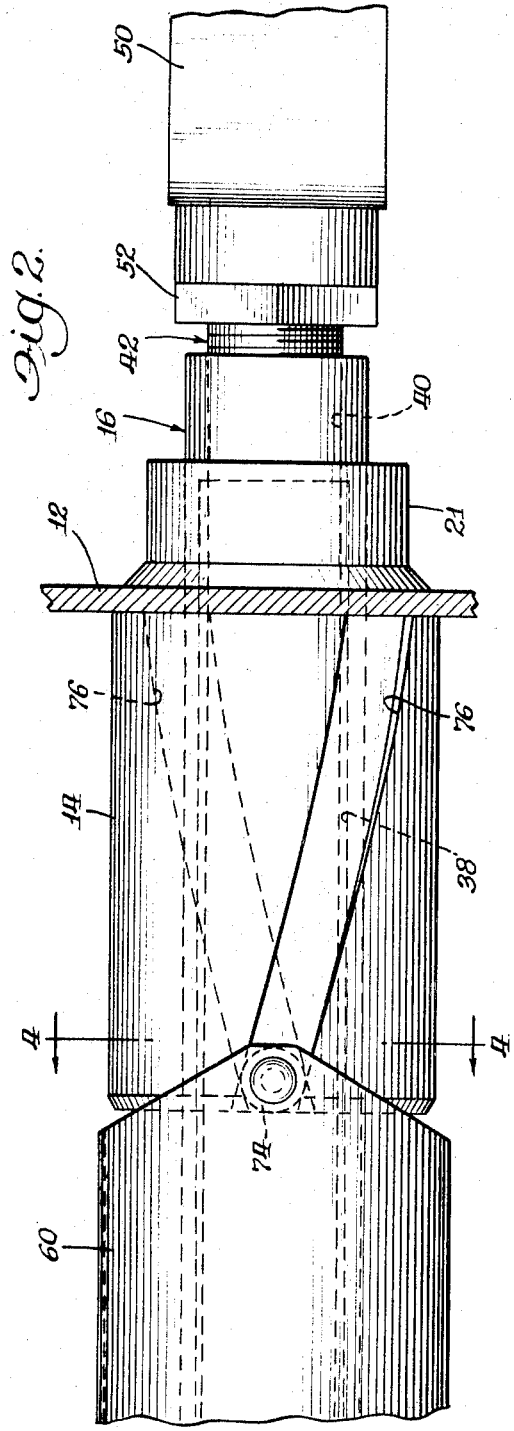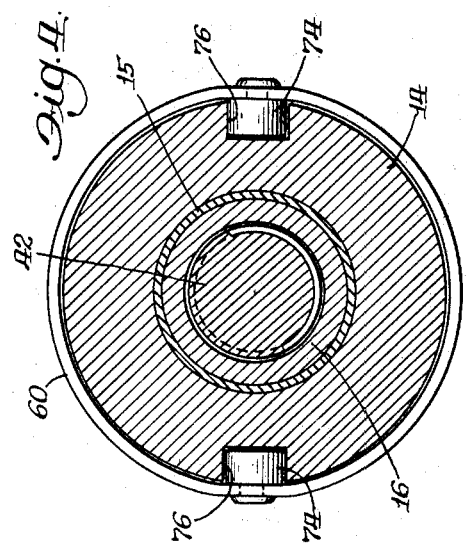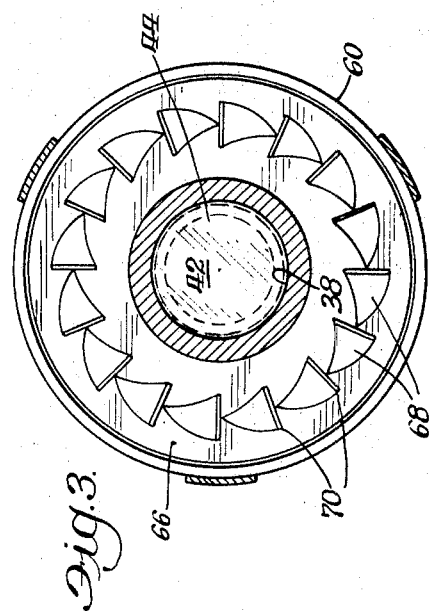

3,432,011
AUTOMATIC SLACK ADJUSTER
Russell G. Altherr, Munster, Ind., assignor to Amsted Industries Incorporated, Chicago, Ill., a corporation of New Jersey
Filed Nov. 9, 1966, Ser. No. 593,065
U.S. Cl. 188—196    3 Claims
Int. Cl. F16d 65/38

ABSTRACT OF THE DISCLOSURE

In a railway car brake slack adjuster of the type in which a hollow shaft is threaded concentrically around a brake actuator rod and a cylindrical member concentric around the shaft and rod is moved by a push plate axially with the shaft and rod in brake-applying movement and on excess of such movement is caused to rotate in one direction and, by means of a ratchet connection with the shaft, on return movement and reverse rotation causes similar reverse rotation of the shaft relative to the rod so as to take up slack in the brake rigging, the improvement consists in interposing a friction plate between the push plate and the ratchet connection in order to prevent rotation of the shaft during axial movement in brake-applying direction.

Summary of the invention

This invention relates to brakes and more particularly to an improved device for taking up slack in brake gear between the air brake cylinder and the brake shoe, whereby piston travel conforms to maximum effectiveness of braking.

An object of this invention is to provide a slack adjustment device of relatively simple design for use within a brake actuating mechanism.

Another object of this invention is the provision of a combination power cylinder-slack adjustment device wherein the slack adjustment device is directly operable by the power cylinder.

The above and other objects, which will become apparent to those skilled in the art, will appear in the following description and appended claims, and in conjunction with the accompanying drawings wherein:

FIGURE 2 is a fragmentary top sectional view, taken through section line 2—2 of FIGURE 1.

FIGURE 3 is a fragmentary transverse view taken through line 3—3 of FIGURE 1, showing the details of a ratchet member.

FIGURE 4 is a transverse section taken through section line 4—4 of FIGURE 2.

Figure 1:
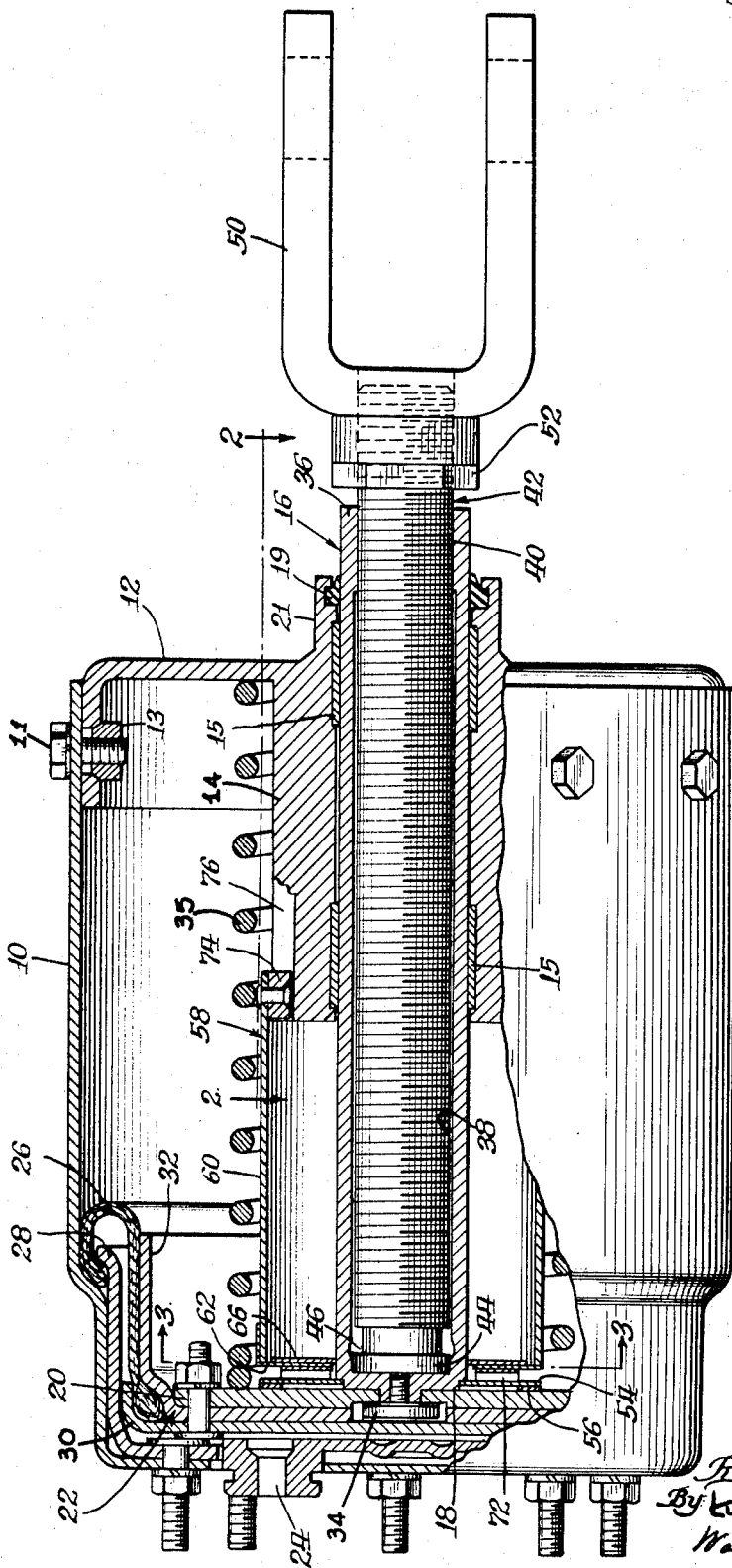
FIGURE 1 is a fragmentary side elevational view, partly in vertical section, of a power brake actuating mechanism embodying the invention described herein.

With reference to the drawings, FIGURES 1 and 2 show a power brake cylinder comprising a housing 10 and an end plate 12 secured by bolts 11 and nuts 13 within one end of said housing. End plate 12 has a central inwardly projecting sleeve 14 secured thereto containing guide bushings 15 journaled on centrally disposed adjuster shaft 16, thereby permitting axial movement of said adjuster shaft through said sleeve. A rod wiper 19 is contained within the outwardly projecting portion 21 of sleeve 14 for retaining lubricants within the device during its operation.

Adjuster shaft 16 is urged outwardly from its inner end 18 by any suitable power means having a piston or other actuating means that is rotationally stationary during its actuation of a brake lever. Such power means 22, as shown in FIGURE 1, may include a diaphragm assembly which has means for introducing fluid pressure through a port 24 against a flexible diaphragm 26, one end thereof sealed between housing 10 and an outer diaphragm clamp 28 secured to said housing, the other end thereof sealed between an inner diaphragm clamp 30 and a diaphragm guide 32, said guide and inner clamp being secured together and to a push plate 20 for unitary axial movement therewith. The inner end 18 of adjuster shaft 16 is operatively connected to push plate 20 by cap screw 34, said cap screw being loosely installed to permit limited rotation of adjuster shaft 16 relative to push plate 20, but otherwise to provide a positive connection therebetween. Helical release spring 35 is disposed centrally between push plate 20 and the inner surface of end plate 12.

Adjuster shaft 16 is generally a cylindrical body with a substantial portion from its outer end 36 being hollow, forming cylindrical cavity 38. A short length of internal threads 40 is formed within cylindrical cavity 38 near outboard end 36 of adjuster shaft 16 for engagement with continuously threaded brake actuator 42 extending within cylindrical shaft cavity 38 and having disk-shaped bearing 44 secured to its inner end 46 for axial sliding engagement with the unthreaded portion of said shaft cavity. The outboard end 48 of continuously threaded brake actuator engages a yoke 50 secured by a lock nut 52, for attachment to a brake lever (not shown).

Positive friction for preventing rotation of adjuster shaft 16 relative to push plate 20 during outward axial movement of said adjuster shaft and said push plate is provided by conical-shaped friction plate 54 secured to said adjuster shaft proximate its inner end 18 by engaged dowel pins (not shown) or by other suitable means. A ring of high friction material 56, such as cork, is secured near the outer periphery of conical friction plate 54 on the side thereof adjacent to push plate 20, such that the assembly of cap screw 34 through said push plate into adjuster shaft 16 causes said friction plate to act as a spring and be borne, with accompanying high friction material, against said push plate.

Cam and ratchet assembly, generally indicated by 58, has centrally disposed cylindrical member 60, which surrounds an inner portion of adjuster shaft 16. Adjacent to friction plate 54, secured to one end of cylindrical member 60 is washer-shaped ratchet member 62, the inner radial edge thereof surrounding and closely adjacent to the surface of adjuster shaft 16. An opposing disk-shaped ratchet member 66 is secured around adjuster shaft 16, closely adjacent to ratchet member 62. Both ratchet members 62 and 66 have on their opposing surfaces a plurality of circumferentially equi-spaced steps or ridges 70 located at common radial distances. As shown in FIGURE 3, the ridges 70 of ratchet member 66 may comprise a plurality of protrusions 68 which gradually arise at one end thereof from the surface of said ratchet member and terminate relatively abruptly at the other end thereof. The ridges of one ratchet member engage recesses between adjacent ridges of the other ratchet member, thereby forming in combination a uni-directional ratchet. A wave washer 72 is disposed between friction plate 54 and its adjacent ratchet member 62, thereby providing means to hold opposing surfaces of ratchet members 62 and 66 in contact.

Secured proximate the other end of cylindrical member 60 are a pair of opposed inwardly projecting lugs 74 which engage respective opposing helical grooves 76 formed in the surface of inwardly projecting sleeve 14 of end plate 12, such that sliding engagement of said lugs in said grooves causes rotation of said cylindrical member and the ratchet member 62 secured thereto.

In operation, on the outward stroke toward brake applied position, air pressure against flexible diaphragm 26 and inner diaphragm clamp 30 causes push plate 20 and cam ratchet assembly 58 to move axially outwardly. This movement causes lugs 74 to travel in helical grooves 76 on relatively stationary end plate sleeve 14, which causes rotation of cylindrical member 60 and the ratchet member 62 secured thereto to rotate. As ratchet member 62 rotates, contacting ratchet member 66 secured on adjuster shaft 16 remains relatively stationary, the friction between opposing ratchet surfaces being overcome by the friction between friction plate 54 and push plate 20. The slack adjustment device is so constructed that a predetermined distance of travel of adjuster shaft 16 will cause ratchet members 62 and 66 to engage in a new position.

When pressure is released from the power cylinder, helical spring 35 causes axial motion of adjuster shaft 16 and cam and ratchet assembly 58 in the opposite direction, and ridges 70 on opposing ratchet members 62 and 66 engage to overcome friction between clutch plate 54 and push plate 20 and to rotate adjuster shaft 16 around rotationally stationary continuously threaded brake actuator 42, thereby causing said brake actuator to be borne outwardly to take up the slack in the brake gear. In order to reset the device, a tool may be inserted in grooves 76 against lugs 74, thereby separating ratchet members 62 and 66 and allowing adjuster shaft 16 to be rotated by hand in the opposite direction.

It will be understood that various changes in the details, materials, steps and arrangements of parts, which have been herein described and illustrated in order to explain the nature of the invention may be made by those skilled in the art within the principle and scope of the invention as expressed in the appended claims.

Having thus described the invention, what is claimed is:

1. In a power cylinder for a brake having a push plate movable within substantially the entire length of the chamber of said cylinder and connected to a shaft, a slack adjuster comprising a brake actuator in threaded engagement with the shaft, a sleeve extending within said chamber around said shaft, helical grooves in said sleeve, a friction plate connected to said shaft, said plate having a ring of friction material at its peripheral margin, said material engaging said push plate to prevent rotation of said shaft during axial movement in a direction toward brake applied position, and means engaging said grooves for turning said shaft relative to said brake actuator during axial movement thereof in the other direction.

2. The invention according to claim 1 wherein said last-mentioned means includes a cylindrical member disposed around said shaft, inwardly facing lugs secured to said cylindrical member and engaging the grooves of said sleeve, ratchet means between said cylindrical member and said shaft which engage during axial movement of said brake actuator and shaft in said other direction, and resilient means between said friction plate and said ratchet means.

3. The invention according to claim 1 wherein said friction plate is conical, and including means clamping the push plate to the shaft with said friction plate acting as an interposed spring.

References Cited

UNITED STATES PATENTS 1,755,305   4/1930   Osborn _____ 188—202

DUANE A. REGER, *Primary Examiner.*

U.S. Cl. X.R.

188—203